(12) United States Patent
Sun et al.

(10) Patent No.: US 11,852,812 B1
(45) Date of Patent: Dec. 26, 2023

(54) INCORPORATING CAMERA THROUGH OR AUGMENTED REALITY VISION INTO A HEADSET

(71) Applicant: Sony Interactive Entertainment Inc., Tokyo (JP)

(72) Inventors: Hee Gyung Sun, San Francisco, CA (US); Benjamin Andrew Rottler, San Franciso, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/887,293

(22) Filed: Aug. 12, 2022

(51) Int. Cl.
 *G02B 27/01* (2006.01)
 *G06T 19/00* (2011.01)

(52) U.S. Cl.
 CPC .......... *G02B 27/017* (2013.01); *G06T 19/006* (2013.01); *G02B 2027/0138* (2013.01)

(58) Field of Classification Search
 CPC ........ G02B 27/0172; G02B 2027/0138; G06T 7/11; G06T 7/20; G06T 7/593; G06T 7/70; G06T 19/006; G06T 2207/10016; G06V 10/235; G06V 10/25; G06V 10/751; G06V 20/20; G06V 20/70
 See application file for complete search history.

(56) References Cited

U.S. PATENT DOCUMENTS

| | | | |
|---|---|---|---|
| 2018/0341811 A1* | 11/2018 | Bendale | .................. G06T 7/70 |
| 2019/0371075 A1* | 12/2019 | Stafford | ................ H04N 23/69 |
| 2021/0104211 A1* | 4/2021 | John | ...................... G06F 3/017 |

\* cited by examiner

*Primary Examiner* — Nelson M Rosario
(74) *Attorney, Agent, or Firm* — Procopio, Cory, Hargreaves & Savitch LLP

(57) ABSTRACT

Incorporating camera through (CT) or augmented-reality (AR) vision into a display of a headset, including: displaying the CT or AR vision on a view screen of the display of the headset, when the CT or AR vision is selected by a user; prompting the user to enter or select at least one object to be highlighted on the view screen in a CT or AR vision mode; and highlighting the at least one selected object on the view screen.

16 Claims, 6 Drawing Sheets

INCORPORATING CAMERA THROUGH OR AUGMENTED REALITY VISION INTO A HEADSET

BACKGROUND

Field

The present disclosure relates to camera through (CT) or augmented reality (AR) vision, and more specifically, to incorporating CT or AR vision into a display of a virtual reality (VR) headset.

Background

Conventional head-mounted devices providing virtual reality for wearers are widely available for use with video games and other applications. In general, each device includes a 3-D display, audio, and head motion sensors including gyroscopes, accelerometers, and other related sensors. However, the conventional head-mounted devices generally do not include other visual aids.

SUMMARY

The present disclosure provides for incorporating camera through (CT) or augmented-reality (AR) vision into a display of a headset.

In one implementation, a method for incorporating CT or AR vision into a display of a headset is disclosed. The method includes displaying the CT or AR vision on a view screen of the display of the headset, when the CT or AR vision is selected by a user. The method also includes prompting the user to enter or select at least one object to be highlighted on the view screen in a CT or AR vision mode. The method further includes highlighting the at least one selected object on the view screen.

In another implementation, a system for incorporating CT or AR vision into a display of a headset coupled to a game system is includes a headset camera, a display interface, a user interface, and a processor. The headset camera is mounted outside of the headset and is configured to feed visual image into a view screen of the display of the headset in a CT or AR vision mode. The display interface is coupled to the game system and displays a system menu on the view screen and to enable the user to select the CT or AR vision mode from the system menu. The display interface also displays the CT or AR vision on the view screen, when the CT or AR vision mode is selected. The user interface enables the user to select the CT or AR vision mode from the system menu, and to select at least one object to be highlighted in the CT or AR vision on the view screen. The processor highlights the at least one object on the view screen of the display of the headset in the CT or AR vision mode.

In yet another implementation, a computing device for providing a virtual reality environment to a head mount display (HMD) device during a virtual reality (VR) session presented to the HMD device is disclosed. In this implementation, the computing device includes: at least one camera coupled to the HMD device, the at least one camera to capture first image during the VR session; a processor to: receive the first image captured by the at least one camera; analyze the first image to determine whether at least one input device is included in the first image; and provide a second image to be displayed on a display of the HMD device, wherein the second image includes the at least one input device highlighted when the at least one input device is found in the first image.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional head-mounted devices generally do not include other visual aids such as cameras mounted on the outside of the headset for visualizing, for example, surroundings or body of a user. Thus, in certain situations, incorporating inputs from the head-mounted visual aids may be beneficial.

Certain implementations of the present disclosure provide methods and systems for incorporating camera through (CT) or augmented-reality (AR) vision into a display of the virtual reality (VR) headset (e.g., a head-mounted display (HMD)). In one implementation, a headset camera is mounted on the outside of the headset and the visual image from the headset camera is fed into the HMD in a CT or AR vision mode (e.g., in a superimposed mode). In another implementation, object(s) (e.g., 3-D rendered controller) is highlighted in the CT or AR vision mode. In yet another implementation, a user is enabled to place a window (e.g., a picture-in-picture window) in a 3-D game space displayed on the HMD. In a further implementation, the VR headset is connected to a network which may provide real-world visual input into the HMD device in the CT or AR vision mode.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1A:
FIG. 1A is one example of a view screen of a display of the VR headset (e.g., HMD) mentioned above in accordance with one implementation of the present disclosure.

FIG. 1A is one example of a view screen 100 of a display of the VR headset (e.g., HMD) mentioned above in accordance with one implementation of the present disclosure. In the illustrated implementation of FIG. 1A, the CT or AR vision mode 104 mentioned above is included in a system menu of 102 the view screen 100 as one of the selectable items 104 of the system menu 102.

Figure 1B:
FIG. 1B is another example of a view screen of the display of the VR headset with object(s) highlighted in accordance with one implementation of the present disclosure.

FIG. 1B is another example of a view screen 110 of the display of the VR headset with object(s) highlighted in accordance with one implementation of the present disclosure. Thus, in one implementation, the view screen 110 of FIG. 1B can be entered after selecting the CT or AR vision mode 104 in the system menu 102 of FIG. 1A.

In one implementation, the view screen 110 of FIG. 1B shows a 3-D rendered controller 112 highlighted in the CT or AR vision. In FIG. 1B, the CT or AR vision of the view screen 110 also shows a message 114 that the controller 112 is located. In other implementations, the CT or AR vision of the view screen 110 may include a view of the user's hand holding the controllers to show the placement of the user's hands to provide perspective of the surroundings to the user.

Figure 1C:
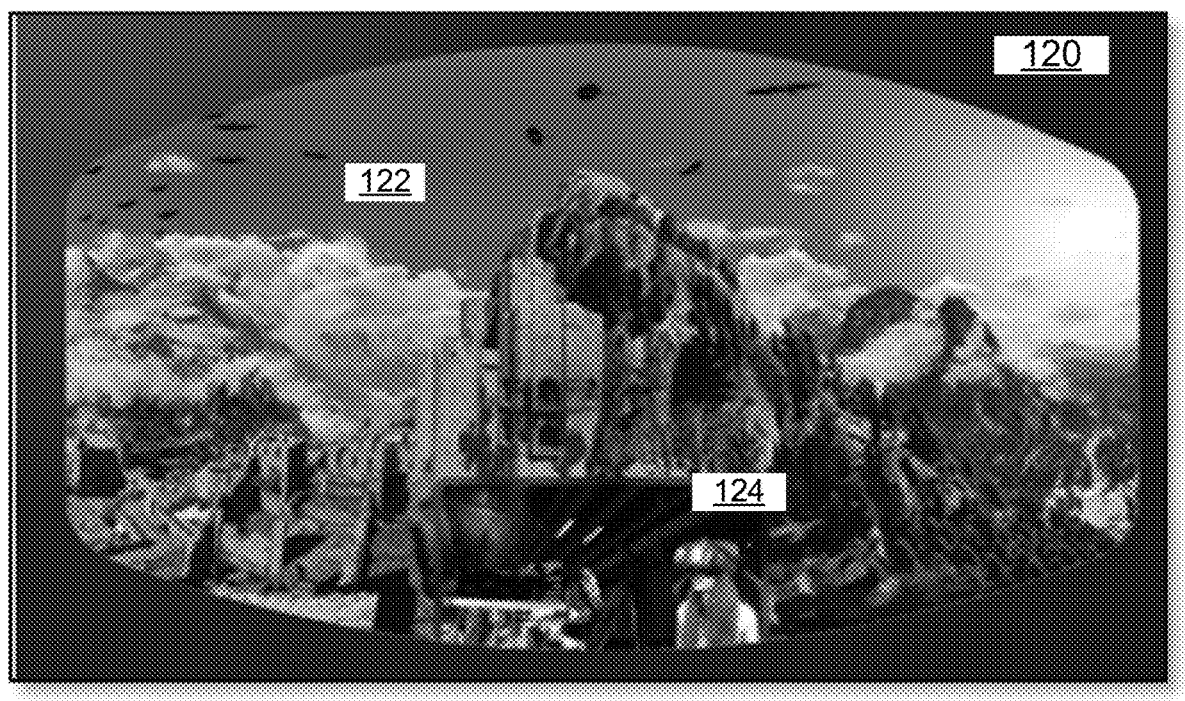
FIG. 1C is another example of a view screen of the display of the VR headset in accordance with one implementation of the present disclosure.

FIG. 1C is another example of a view screen 120 of the display of the VR headset in accordance with one implementation of the present disclosure. In the illustrated implementation of FIG. 1C, the view screen 120 shows a 3-D game space 122 displayed on the HMD with a picture-in-picture (PIP) window 124 superimposed on the game space 122. In one implementation, the user is enabled to display the CT or AR vision of the headset on the PIP window 124. In another implementation, the user is enabled to display a real-world visual image such as video or image downloaded from a network. In this implementation, it is assumed that the headset is connected to the network providing the real-world visual image. In one implementation, the headset is a VR headset.

Figure 2A:
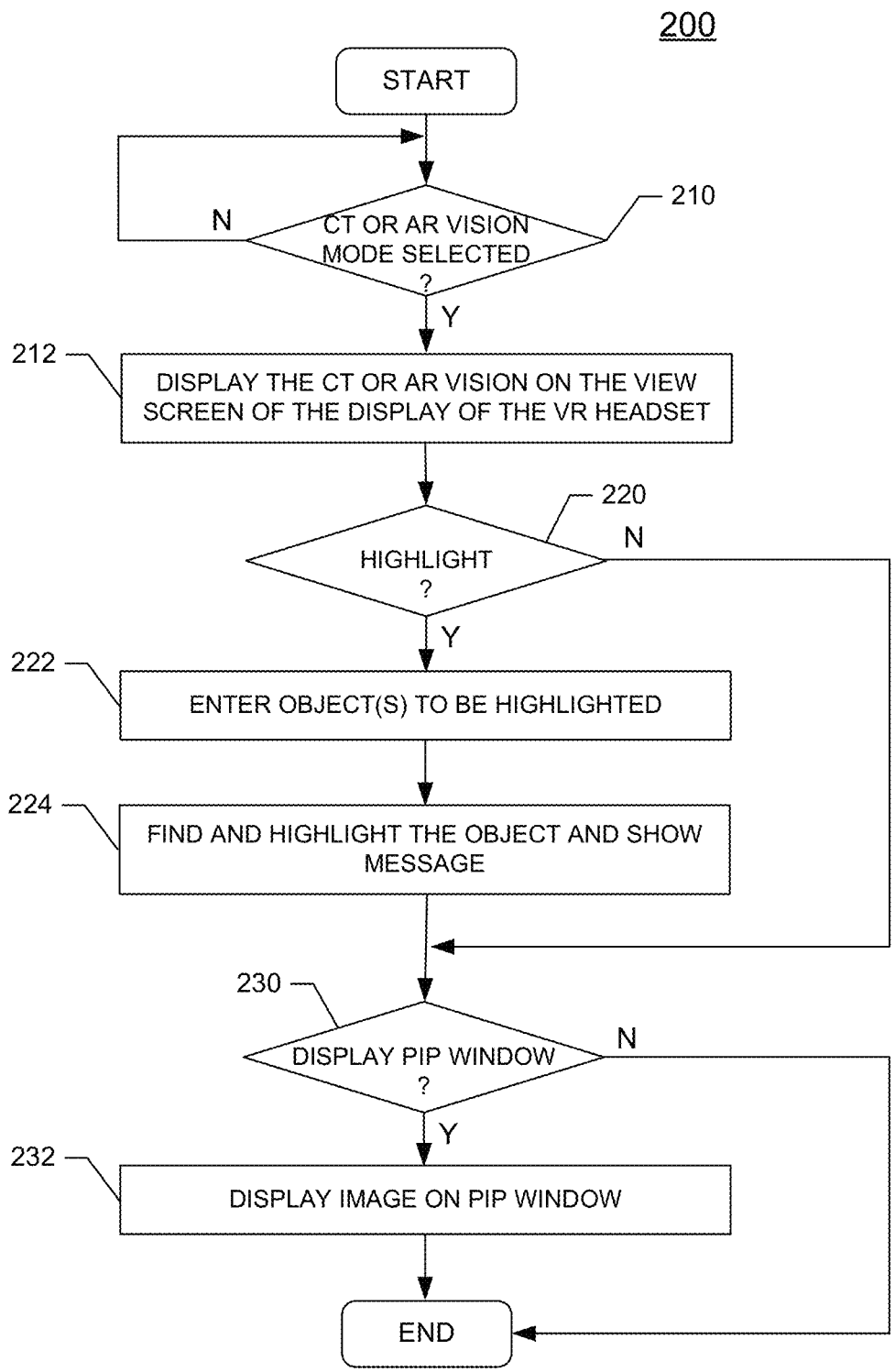
FIG. 2A is a flow diagram of a process for incorporating CT or AR vision into a display of the headset in accordance with one implementation of the present disclosure.

FIG. 2A is a flow diagram of a process 200 for incorporating CT or AR vision into a display of the headset in accordance with one implementation of the present disclosure. In one implementation, prior to executing the process 200, a headset camera is mounted on the outside of the headset (e.g., the HMD) and the visual image from the headset camera is fed into the HMD in a CT or AR vision mode. In another implementation, prior to executing the process 200, a network interface device capable of providing an Internet connection to the headset is coupled to the headset.

In the illustrated implementation of FIG. 2A, the process 200 initially displays a menu of a system on the view screen and waits on the selection of the CT or AR vision mode, at step 210. The CT or AR vision is displayed on the display of the headset, at step 212, when the CT or AR vision mode is selected.

In one implementation, the system is a VR gaming system capable of performing CT/AR vision mode using at least one camera including the headset camera mounted on the HMD device and another camera separately coupled to the HMD device. In this implementation, the system menu includes icon images showing at least one of gaming and non-gaming applications displayed on the HMD. Further, the VR gaming system is capable of receiving the captured image data through the at least one camera and displaying the image data on the display when the CT/AR vision mode is selected by clicking on the icon image of the CT/AR vision mode. Thus, in this implementation, one of the non-gaming applications is an application to display the captured image data as the CT/AR vision mode. In one example implementation shown in FIG. 1A, the icon image (e.g., 106 in FIG. 1A) for the CT/AR vision mode is displayed (in a predetermined location) as being larger than other icon images. In this implementation, the icon image of the CT/AR vision mode is constantly updated based on the image captured by the at least one camera when it is in the predetermined location.

If the user selects the CT/AR vision mode, at step 210, the process 200 moves to step 212 and then prompts the user, at step 220, whether there is any object(s) to be highlighted. A prompt or list for entering a type of objects to highlight is displayed, at step 222, when the highlight option was selected, at step 220. For example, the user can enter term "controller" or "vase" when prompted. In another example, the process 200 enables the user to select an item from a list of pre-defined items including "controller". The object(s) is then searched for and highlighted on the view screen of the display of the VR headset, at step 224. In one implementation, the view screen shows a 3-D rendered controller highlighted in the CT or AR vision. In another implementation, the view screen also shows a message that the object (i.e., the controller in this case) is located. In other implementations, the view screen includes a view of the user's hand holding the controller(s) to show the placement of the user's hands to provide perspective of the surroundings to the user.

Figure 2B:
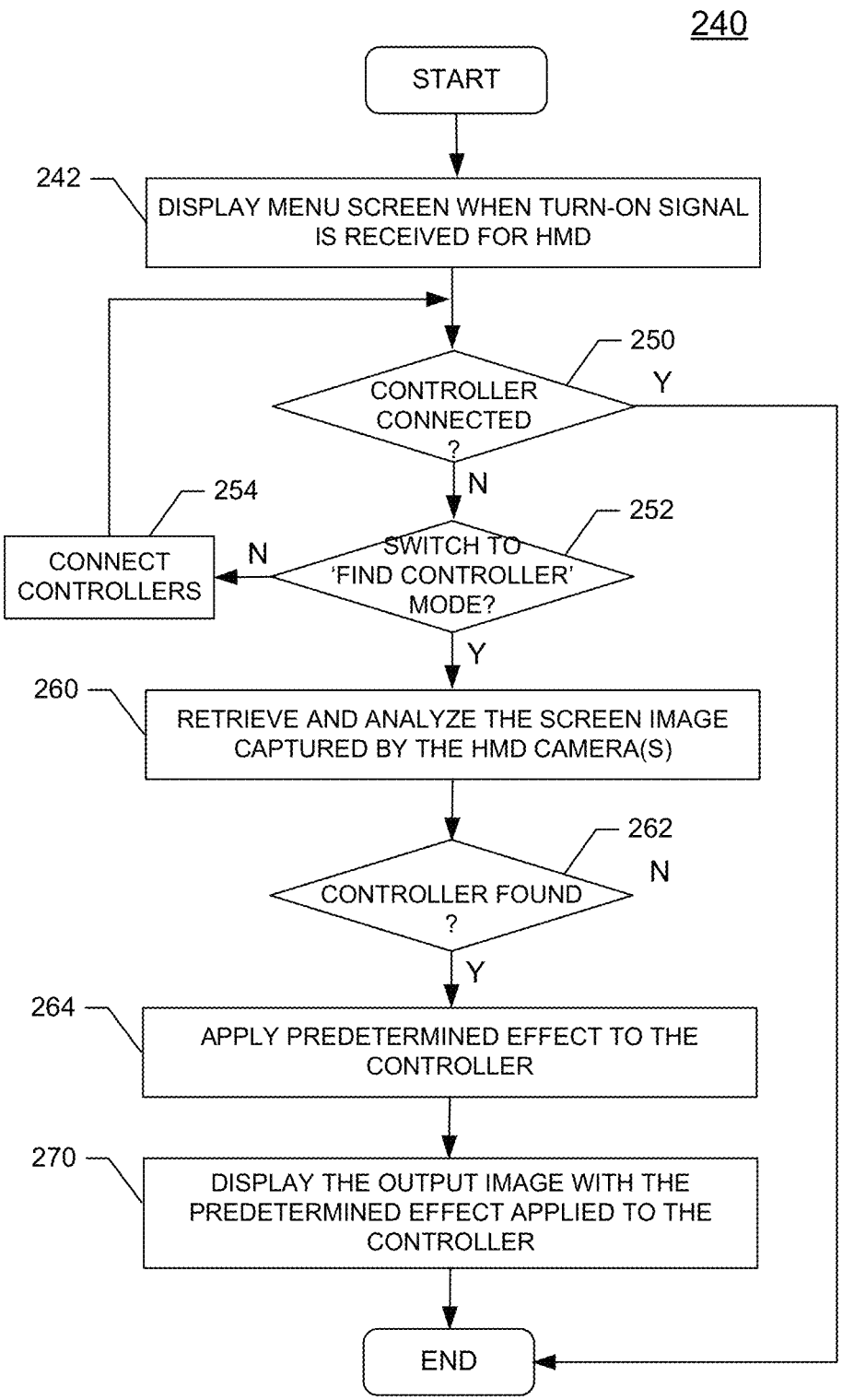
FIG. 2B is a flow diagram of a process for finding and highlighting the controller on the view screen of the display of the VR headset in accordance with one example implementation of the present disclosure.

In one example implementation, the object to be searched for in step 224 is a controller. FIG. 2B is a flow diagram of a process 240 for finding and highlighting the controller on the view screen of the display of the VR headset in accordance with one example implementation of the present disclosure. In the illustrated implementation of FIG. 2B, a turn-on signal is received at the HMD device coupled to a VR gaming system, and a menu screen is displayed on the HMD, at step 242, when the HMD device is turned on. In one implementation, the turn-on signal is received when a user is wearing the HMD device. Once the menu screen is displayed on the HMD, at step 242, a status check is made, at step 250, to determine whether a desired number of controllers is connected to the VR gaming system. In one implementation, a situation in which less than the desire number of controllers being connected includes when only one of the connectors is connected or the controller is not powered on.

In one implementation, if it is determined, at step 250, that the desired number of controllers is not connected, a query is made, at step 252, whether to switch to the 'find controller' mode (e.g., a CT/AR vision mode). If the user does not wish to switch to the 'find controller' mode, at step 252, a prompt screen to connect the desired number of controllers is displayed, at step 254. Otherwise, if the 'find controller' mode is selected, at step 252, a screen image captured by the camera(s) coupled to the HMD device is retrieved and analyzed, at step 260.

In an alternative implementation, if the controller(s) is not included in the captured image, a 'find controller' mode is entered, at step 260, by the game system without any input from user. In this implementation, the 'find controller' mode is entered even if the controller(s) is turned on. In one implementation, the 'find controller' mode is entered by the user by at least one of pressing any one of the buttons on the HMD device and any voice commands. In another implementation, the 'find controller' mode is entered when no input from the user is detected for a certain period of time (e.g., 5 minutes).

A determination is then made, at step 262, whether at least one controller is included in the captured screen image. If at least one controller is found in the captured screen image, at step 262, a predetermined effect is applied, at step 264, to the at least one controller in the captured screen image to highlight the controller(s). In one implementation, the predetermined effect includes outlining the edges of the controller with a bright color such that the controller stands out in the captured screen image (e.g., see controller 112 in FIG. 1B). In an alternative implementation, if the controller(s) is not found in the captured image, at step 262, the controller's location is determined using wireless communication (e.g., Bluetooth). Once the location has been determined, a directional guide to the controller may be provided on the captured image. In one implementation, the CT/AR vision mode is terminated by pressing a button on the controller (when the controller(s) is connected) or any icon image. Termination of the CT/AR vision mode and return to the menu screen may be displayed on the HMD. Finally, an output image with the effects applied to the controller(s) is displayed on the HMD, at step 270.

Returning to FIG. 2A, the process 200 moves on to step 230, in which the user is enabled to select displaying the CT or AR vision in a PIP window superimposed on an image (e.g., game space) shown on the view screen.

In step 230, the user is enabled to also enter different vision (i.e., other than the CT or AR vision) to be displayed on the PIP window. For example, the user is enabled to display a real-world visual image such as video or image downloaded from a network. In this implementation, it is assumed that the VR headset is connected to the network providing the real-world visual image. Once selected, the PIP window is superimposed on an image shown on the view screen, at step 232. As stated above, the PIP window may include the CT or AR vision or other vision selected by the user.

In one implementation, with the at least one camera mounted on the HMD device or separately coupled to the HMD device, the captured image is superimposed on a game screen the user is currently playing. This implementation enables the user to easily create photos and videos including the captured image of the user playing the game and upload the photos and videos to social network services (SNS) or distribution platforms. In another implementation, the user uses input video(s) from the selected camera(s) to superimpose on the screen, when user has two or more input sources.

In a particular implementation, a method for incorporating CT or AR vision into a display of a headset is disclosed. The method includes: displaying the CT or AR vision on a view screen of the display of the headset, when the CT or AR vision is selected by a user; prompting the user to enter or select at least one object to be highlighted on the view screen in a CT or AR vision mode; and highlighting the at least one selected object on the view screen.

In one implementation, the method further includes displaying a message that the at least one object is located. In one implementation, the method further includes displaying a view of at least one hand of the user holding the at least one object. In one implementation, the method further includes prompting the user to select displaying the CT or AR vision in a picture-in-picture (PIP) window superimposed on an image shown on the view screen. In one implementation, the image shown on the view screen is a game space image. In one implementation, the method further includes prompting the user to select displaying a real-world visual image in a picture-in-picture (PIP) window superimposed on an image shown on the view screen. In one implementation, the CT or AR vision comprises a visual image fed into the display of the headset from a headset camera mounted on outside of the headset. In one implementation, the headset includes a virtual reality (VR) head-mounted display (HMD). In one implementation, the method further includes displaying a system menu on the view screen with a list of items including the CT or AR vision. In one implementation, the method further includes displaying a list of pre-defined items to be highlighted.

Figure 3:
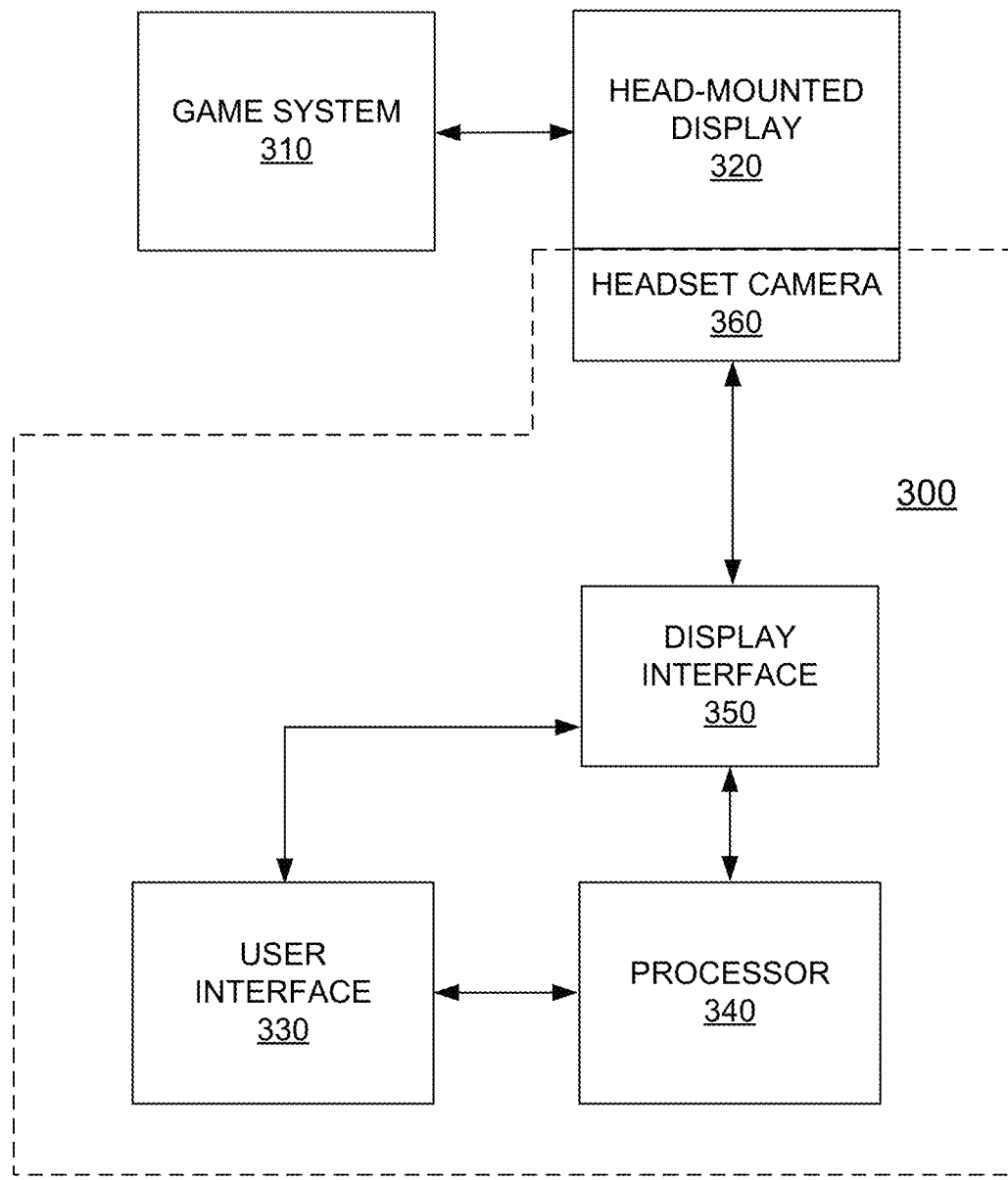
FIG. 3 is a block diagram of a system for incorporating CT or AR vision into a display of the headset in accordance with one implementation of the present disclosure.

FIG. 3 is a block diagram of a system 300 for incorporating CT or AR vision into a display of the headset in accordance with one implementation of the present disclosure. In the illustrated implementation of FIG. 3, the system 300 includes a headset camera 360, a user interface 330, a processor 340, and a display interface 350 coupled to the processor 340 and a game system 310 through a head-mounted display (HMD) 320. In one implementation, the blocks 330, 340, 350 of the system 300 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In one implementation, the headset camera 360 is mounted on the outside of the headset and the visual image from the headset camera is fed into the HMD in a CT or AR vision mode. In another implementation, a network interface device capable of providing an Internet connection to the VR headset is coupled to the headset.

In the illustrated implementation of FIG. 3, the display interface 350 displays a system menu on the view screen of the HMD 320 and waits on the selection of the CT or AR vision mode by the user using the user interface 330. The display interface 350 also displays the CT or AR vision on the HMD, when the CT or AR vision mode is selected using the user interface 330, and prompts the user to determine whether there is any object(s) to be highlighted. The display interface 350 further displays a prompt or list for entering a type of objects to highlight, when the highlight option is selected. For example, the user can enter term "controller" or "vase" when prompted. In another example, user is enabled to select an item from a list of pre-defined items including "controller".

In one implementation, the processor 340 highlights the object(s) on the view screen of the HMD. In one implementation, the view screen shows at least one 3-D rendered controller highlighted in the CT or AR vision. In another implementation, the view screen also shows a message that the object (i.e., the controller in this case) is located. In other implementations, the view screen includes a view of the user's hand holding the controller(s) to show the placement of the user's hands to provide perspective of the surroundings to the user.

In one implementation, the processor 340 enables the user to select displaying the CT or AR vision in a PIP window superimposed on an image (e.g., game space) shown on the view screen. The processor 340 also enables the user to enter different vision (i.e., other than the CT or AR vision) to be displayed on the PIP window. For example, the user is enabled to display a real-world visual image such as video or image downloaded from a network. In this implementation, it is assumed that the headset is connected to the network providing the real-world visual image. Once selected, the PIP window is superimposed on an image shown on the view screen. As stated above, the PIP window may include the CT or AR vision or other vision selected by the user.

In one implementation, the game system 310 includes a gaming console providing interactive games or other application programs. In another implementation, the game system 310 includes an online interactive game or other application program. In yet another implementation, the game system 310 includes a virtual reality and/or augmented reality interactive game or application program.

In a particular implementation, a system for incorporating CT or AR vision into a display of a headset coupled to a game system is disclosed. The system includes a headset camera mounted outside of the headset and configured to feed visual image into a view screen of the display of the headset in a CT or AR vision mode; a display interface coupled to the game system, the display interface to display a system menu on the view screen and to enable the user to select the CT or AR vision mode from the system menu, the display interface to display the CT or AR vision on the view screen, when the CT or AR vision mode is selected; a user interface to enable the user to select the CT or AR vision mode from the system menu, and to select at least one object to be highlighted in the CT or AR vision on the view screen; and a processor to highlight the at least one object on the view screen of the display of the headset in the CT or AR vision mode.

In one implementation, the headset is a virtual reality (VR) headset. In one implementation, the at least one object includes at least one 3-D rendered controller highlighted in the CT or AR vision. In one implementation, the at least one highlighted object includes a user's hand holding the at least one 3-D rendered controller. In one implementation, the view screen includes a message that the at least one object is located. In one implementation, the game system includes a gaming console providing interactive games. In one implementation, the game system includes an online interactive game.

In another particular implementation, a computing device for providing a virtual reality environment to a head mount display (HMD) device during a virtual reality (VR) session presented to the HMD device is disclosed. In this implementation, the computing device includes: at least one camera coupled to the HMD device, the at least one camera to capture first image during the VR session; a processor to: receive the first image captured by the at least one camera; analyze the first image to determine whether at least one input device is included in the first image; and provide a second image to be displayed on a display of the HMD device, wherein the second image includes the at least one input device highlighted when the at least one input device is found in the first image.

In one implementation, the processor highlights the at least one input device by applying effects on an image of the at least one input device. In one implementation, the processor applies the effects by adding an object on or near the image of the at least one input device in the second image. In one implementation, the computing device further includes a wireless transceiver to receive wireless signals from the at least one input device. In one implementation, the processor determines a location of the at least one input device using the received wireless signals from the wireless transceiver, and displays icon images on the first image indicating a direction guide from the HMD device to the location of the at least one input device.

Figure 4A:
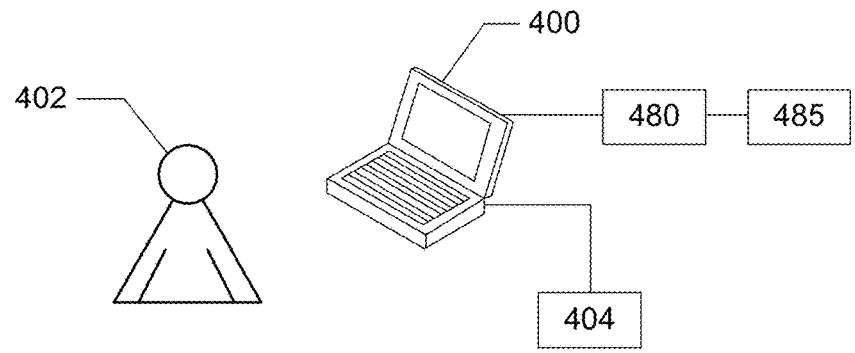
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a headset application 490 for incorporating CT or AR vision into a display of a VR headset with respect to the processes 200 and 240 of FIGS. 2A and 2B and the system 300 of FIG. 3.

Figure 4B:
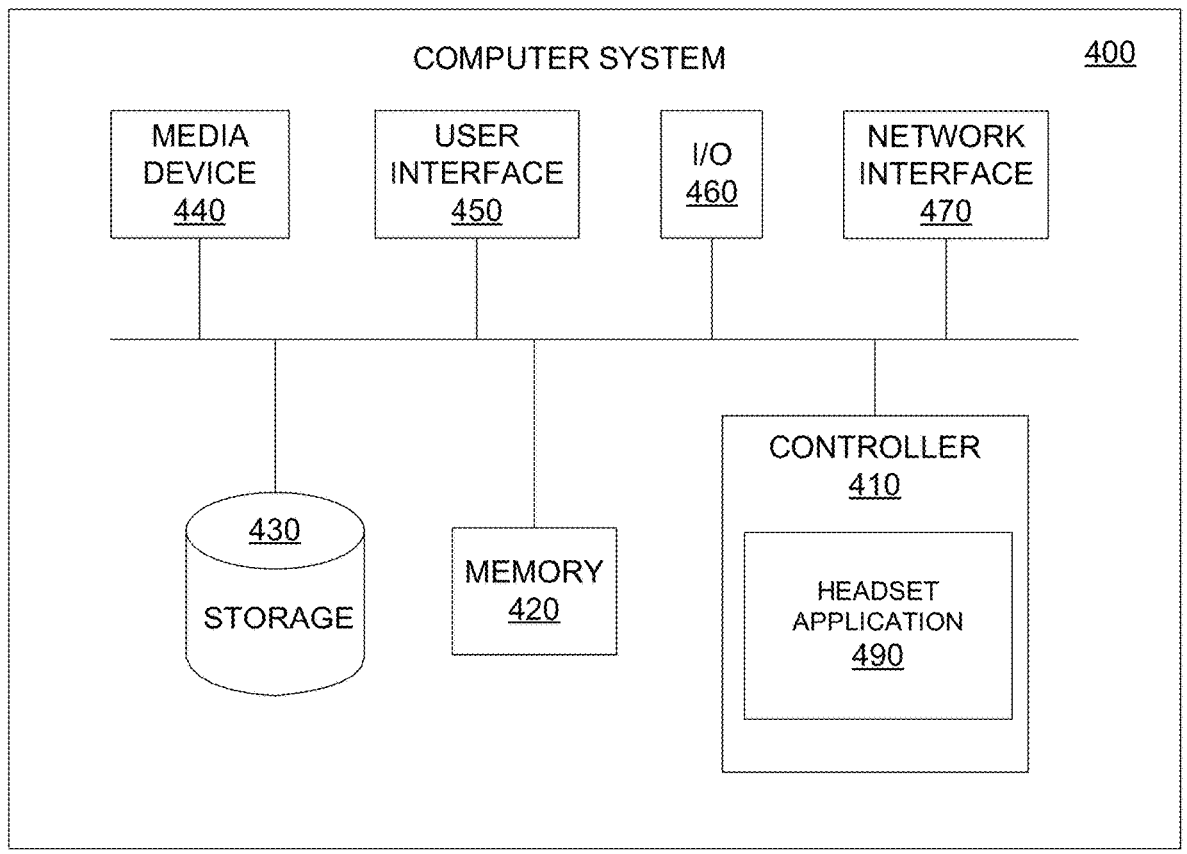
FIG. 4B is a functional block diagram illustrating the computer system hosting the headset application in accordance with an implementation of the present disclosure.

The computer system 400 stores and executes the headset application 490 of FIG. 4B. In addition, the computer system 400 may be in communication with a software program 404. Software program 404 may include the software code for the headset application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the headset application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the headset application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the headset application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the headset application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A computing device for providing a virtual reality environment to a head mount display (HMD) device during a virtual reality (VR) session presented to the HMD device, the computing device comprising:
   at least one camera coupled to the HMD device, the at least one camera to capture first image during the VR session;
   a processor to: receive the first image captured by the at least one camera; analyze the first image to determine whether at least one input device is included in the first image; and provide a second image to be displayed on a display of the HMD device,
   wherein the second image includes the at least one input device highlighted when the at least one input device is found in the first image,
   wherein the processor highlights the at least one input device by applying effects on an image of the at least one input device,
   wherein the processor applies the effects by adding an object on or near the image of the at least one input device in the second image.

2. The computing device of claim 1, wherein the at least one camera is configured to feed visual image into a view screen of the HMD device in a CT or AR vision mode.

3. The computing device of claim 2, wherein the view screen includes a message that the at least one input device is located.

4. The computing device of claim 2, wherein the at least one input device includes at least one 3-D rendered controller highlighted in the CT or AR vision mode.

5. The computing device of claim 4, wherein the at least one highlighted input device includes a user's hand holding the at least one 3-D rendered controller.

6. The computing device of claim 1, wherein the HMD device is coupled to a game system.

7. The computing device of claim 6, wherein the game system includes a gaming console providing interactive games.

8. The computing device of claim 6, wherein the game system includes an online interactive game.

9. A computing device for providing a virtual reality environment to a head mount display (HMD) device during a virtual reality (VR) session presented to the HMD device, the computing device comprising:
   at least one camera coupled to the HMD device, the at least one camera to capture first image during the VR session;
   a processor to: receive the first image captured by the at least one camera; analyze the first image to determine whether at least one input device is included in the first image; and provide a second image to be displayed on a display of the HMD device,
   wherein the second image includes the at least one input device highlighted when the at least one input device is found in the first image,
   wherein the processor determines a location of the at least one input device using the received wireless signals from the wireless transceiver, and displays icon images on the first image indicating a direction guide from the HMD device to the location of the at least one input device;
   a wireless transceiver to receive wireless signals from the at least one input device.

10. The computing device of claim 9, wherein the at least one camera is configured to feed visual image into a view screen of the HMD device in a CT or AR vision mode.

11. The computing device of claim 10, wherein the view screen includes a message that the at least one input device is located.

12. The computing device of claim 10, wherein the at least one input device includes at least one 3-D rendered controller highlighted in the CT or AR vision mode.

13. The computing device of claim 12, wherein the at least one highlighted input device includes a user's hand holding the at least one 3-D rendered controller.

14. The computing device of claim 9, wherein the HMD device is coupled to a game system.

15. The computing device of claim 14, wherein the game system includes a gaming console providing interactive games.

16. The computing device of claim 14, wherein the game system includes an online interactive game.

* * * * *